C. C. McCONVILLE & J. P. FARNAM.
GEARING.
APPLICATION FILED FEB. 9, 1912.

1,076,685.

Patented Oct. 28, 1913.

WITNESSES

INVENTORS
CURRAN C. McCONVILLE
JULIAN P. FARNAM
BY
ATTORNEYS

UNITED STATES PATENT OFFICE.

CURRAN C. McCONVILLE AND JULIAN P. FARNAM, OF MINNEAPOLIS, MINNESOTA, ASSIGNORS, BY MESNE ASSIGNMENTS, TO EMERSON-BRANTINGHAM COMPANY, OF ROCKFORD, ILLINOIS, A CORPORATION OF ILLINOIS.

GEARING.

1,076,685.     Specification of Letters Patent.     Patented Oct. 28, 1913.

Application filed February 9, 1912. Serial No. 676,625.

*To all whom it may concern:*

Be it known that we, CURRAN C. McCONVILLE and JULIAN P. FARNAM, of Minneapolis, Hennepin county, Minnesota, have invented certain new and useful Improvements in Gearing, of which the following is a specification.

The object of our invention is to provide a simple, variable speed transmission gearing adapted particularly for traction engines, though capable of use in various other places.

A further object is to provide a gearing which will be compact and easily operated and by means of which several forward speeds can be obtained.

The invention consists generally in various constructions and combinations, all as hereinafter described and particularly pointed out in the claims.

Figure 1:
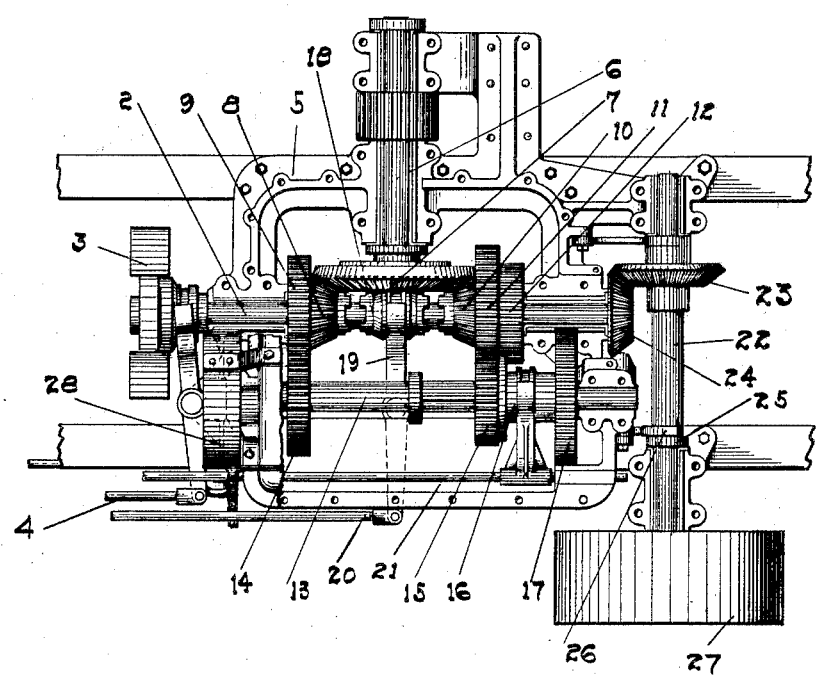
Figure 2:
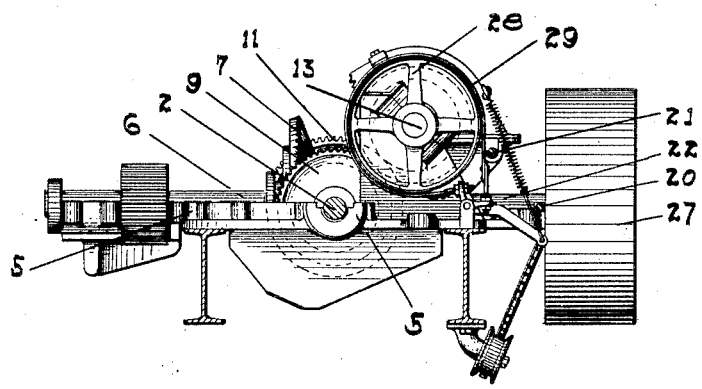

In the accompanying drawings forming part of this specification, Figure 1 is a plan view of a gearing embodying our invention, Fig. 2 is a sectional view of the same.

In the drawing, 2 represents the driving shaft having a clutch 3 controlled by an operating rod 4.

5 is a frame having bearings for the driving shaft and also for a driven shaft 6 arranged at right angles substantially to the shaft 2 and having a beveled gear 7 thereon. A beveled pinion 8 and a gear 9 are secured together and loosely mounted on the shaft 2, the pinion 8 meshing with the gear 7. A similar pinion 10, also loose on the shaft, is provided on the other side of the center of the gear 7 and gears 11 and 12 of varying size are secured to the shaft 2 near the pinion 10 to revolve independently of it. A shaft 13 is journaled in bearings in the frame 5 parallel with the shaft 2 and has a gear 14 secured thereon meshing with the gear 9. A gear 15 is mounted on a sleeve 16 and is splined on the shaft 13 and said sleeve also has a gear 17 mounted thereon of greater diameter than the gear 15. Between the pinions 8 and 10 is a clutch member 18 controlled by a lever 19 and a rod 20, and a rod 21 is connected with the sleeve 16 for moving it back and forth on the shaft 13.

In the operation of the gearing, the movement of the clutch member 18 to the right or the left will lock one of the pinions 8 and 10 on the shaft and transmit power from the driving shaft to the shaft 6 to drive it either forward or backward, as desired. In case the operator wishes to increase the speed of the machine he will throw the clutch member 18 to its neutral position, as indicated in Fig. 1, and move the sleeve 16 to the position indicated by full lines in Fig. 1, when the gear 11 will be in mesh with the gear 15. The power will then be transmitted from the shaft 2 through the gears 11 and 15 to the shaft 13 and from thence through the gears 14 and 9 and the pinion 8 to the gear 7 and the shaft 6. If he should desire to reduce the speed of the engine the sleeve 16 will be moved toward the left until the gear 17 meshes with the gear 12, whereupon power from the driving shaft will be transmitted as before, but the speed of the machine will be reduced.

To facilitate the attachment of a belt between the traction engine and the separator, we provide a shaft 22 having a sleeve 22' splined thereon and capable of a limited longitudinal movement and provided with a beveled pinion 23 meshing with a similar pinion 24 on the drive shaft 2. This sleeve 22' is capable of longitudinal movement to move the pinion 23 into or out of engagement with the pinion 24. Collars 25 are mounted on the sleeve 22' and pivoted dogs 26 are located in the path of the collars to hold the sleeve against premature endwise movement. A pulley 27 is mounted on the end of the shaft and adapted to receive a belt. A brake wheel 28 is mounted on the shaft 13 and provided with a brake strap 29.

With this gearing the driver of the car can easily and quickly increase or decrease the forward speed, as desired. A practical advantage arising from the use of this transmission gearing lies in the fact that should the shaft 13 or its gears become damaged or broken it can be readily removed and the machine operated through the pinions 8 and 10 and the gear 7 in the usual way. We have shown the driving shaft provided with two gears of varying size, secured thereon, but evidently a greater, or even less, number might be employed and provided for the number of forward speeds desired.

We claim as our invention:—

1. The combination, with a driving shaft, of a driven shaft at right angles substantially to said driving shaft, beveled pinions loosely mounted on said driving shaft, a beveled gear mounted on said driven shaft and adapted to mesh with said pinions, a clutch member for locking either one of said pinions to said driving shaft, a shaft parallel with said driving shaft, a gear secured thereon and having a driving connection with one of said beveled pinions, gears of different sizes secured to said driving shaft and gears splined on said parallel shaft and adapted to mesh respectively with the gears secured to said driven shaft, whereby said driven shaft may be revolved forward at a variable speed, and means for moving said splined gears on said parallel shaft, substantially as described.

2. A gearing comprising a driving shaft, a driven shaft, beveled pinions loosely mounted on said driving shaft, a gear secured to one of said pinions, a clutch member interposed between said pinions and adapted to lock either one of them on said shaft, a beveled gear mounted on said driven shaft and adapted to mesh with said pinions, a shaft parallel with said driving shaft, a gear secured on said parallel shaft and meshing with the gear secured to one of said pinions, gears of different sizes secured to said driving shaft, gears splined on said parallel shaft and adapted to mesh respectively with the gears secured to said driving shaft, a shifter controlling the movement of said splined gears, the movement of one of said splined gears into mesh with one of the gears secured on said driving shaft revolving said driven shaft at a faster speed than normal, and the meshing of the other splined gear with the other gear secured on said driven shaft revolving said driven shaft at a speed less than normal.

3. The combination, with a driving shaft, of a driven shaft, beveled pinions loosely mounted on said driving shaft, a beveled gear mounted on said driven shaft and adapted to mesh with said pinions, a clutch member for locking either one of said pinions on said driving shaft, a shaft parallel with said driving shaft, a gear fast thereon and having a driving connection with one of said beveled pinions, a gear secured to said driving shaft, a gear splined on said parallel shaft and adapted to mesh with the gear secured to said driven shaft, means for moving said splined gear on said parallel shaft into and out of mesh with the gear secured to said driving shaft, whereby said driven shaft may be revolved at a variable speed.

4. The combination, with a driving shaft and a transmission shaft parallel therewith, of a driven shaft, forward and reverse pinions loosely mounted on said driving shaft, a beveled gear secured on said driven shaft and adapted to mesh with said pinions, a clutch member for locking either one of said pinions on said driving shaft, a gear secured on said driving shaft, transmission gears mounted on said transmission shaft, means for operatively engaging one of said transmission gears with the gear secured to said driving shaft, the other transmission gear having a driving connection with one of said pinions, whereby said driven shaft may be revolved forward at a variable speed.

5. The combination, with a driving shaft and beveled pinions loosely mounted thereon, of a driven shaft, a gear secured thereon and adapted to mesh with said pinions, a clutch member for locking either one of said pinions on said driving shaft, gears of different sizes secured to said driving shaft, a gear secured to said transmission shaft and having a driving connection with one of said pinions, gears mounted on said transmission shaft and having means for locking them thereon and arranged to mesh with the gears secured to said driving shaft, whereby said driven shaft may be revolved forward at a variable speed.

6. In a speed changing mechanism, parallel driving and transmission shafts, a driven shaft, a beveled gear on said driven shaft, gears loosely mounted upon the drive or power shaft engaging the beveled gear at diametrically opposite points, means to lock said gear on the drive shaft, gears upon the transmission shaft, and additional gears on the drive shaft meshing with the gears on the transmission shaft to transmit rotation to the driven shaft at various speeds.

In witness whereof, we have hereunto set our hands this 30th day of January 1912.

CURRAN C. McCONVILLE.
JULIAN P. FARNAM.

Witnesses:
GENEVIEVE E. SORENSEN,
C. H. REHFUSS.

Copies of this patent may be obtained for five cents each, by addressing the "Commissioner of Patents, Washington, D. C."